United States Patent [19]
Muenchinger

[11] 3,803,889
[45] Apr. 16, 1974

[54] SELF-THREAD FORMING THREADED FASTENERS AND METHOD FOR MAKING SAME

[75] Inventor: Herman G. Muenchinger, South Dartmouth, Mass.

[73] Assignee: Research Engineering and Manufacturing, Inc., New Bedford, Mass.

[22] Filed: May 17, 1972

[21] Appl. No.: 253,974

Related U.S. Application Data

[63] Continuation-in-part of Ser. No. 3,985, Jan. 19, 1970, Pat. No. 3,681,963.

[52] U.S. Cl............................ 72/88, 10/10 R, 10/153
[51] Int. Cl............................ B21h 3/06, B23g 7/00
[58] Field of Search ............ 10/10 R, 152 R, 152 T, 10/153; 72/88, 89, 90, 469; 85/46, 47, 48; 151/22

[56] References Cited
UNITED STATES PATENTS

| | | | |
|---|---|---|---|
| 1,414,641 | 5/1922 | Heames | 72/469 |
| 1,855,668 | 4/1932 | Frayer | 72/469 |
| 2,183,688 | 12/1939 | Olson | 72/88 |
| 2,348,850 | 5/1944 | Richards | 72/88 |
| 3,180,126 | 4/1965 | Carlson | 10/10 R |
| 3,195,156 | 7/1965 | Phipard | 10/10 R |
| 3,263,473 | 8/1966 | Phipard | 72/88 |
| 3,342,234 | 9/1967 | Evans | 151/22 |
| 3,461,470 | 8/1969 | Cochrum | 10/10 R |
| 3,683,437 | 8/1972 | Larson | 10/10 R |

Primary Examiner—Charles W. Lanham
Assistant Examiner—E. M. Combs
Attorney, Agent, or Firm—Olson, Trexler, Walters & Bushnell

[57] ABSTRACT

A self-thread forming threaded fastener has a straight thread on a shank of circular cross section and a tapered thread on a work-entering end. The tapered portion of the thread is of lobular root, pitch and crest surface cross sections and which lobular configuration is continued, but to a diminishing extent, on the first few threads on the shank immediately adjacent to the tapered section. The fastener is formed by rolling between thread-rolling dies a blank having a cylindrical shank of circular cross section and an end section of arcuate lobular cross section including a tapered portion. The cylindrical shank may include a reduced diameter section adjacent to the end section. At least the lobular and tapered portions of the blank are intermittently deflected first in one direction and then in the opposite direction by the dies. Due to such deflections of the end of the blank, a lobular tapered thread is produced on the tapered portion of the blank. The reduced diameter section prevents the thread crest formed therein from being radially outwardly of the crest of the round thread on the shank.

6 Claims, 31 Drawing Figures

PATENTED APR 16 1974 3,803,889

PATENTED APR 16 1974 3,803,889

SELF-THREAD FORMING THREADED FASTENERS AND METHOD FOR MAKING SAME

CROSS-REFERENCE TO RELATED APPLICATION

This application is a continuation-in-part of my co-pending application Ser. No. 3,985, filed Jan. 19, 1970, now U.S. Pat. No. 3,681,963.

BACKGROUND OF THE INVENTION

The present invention relates to thread-forming fasteners such as self-tapping screws and to methods and apparatus for manufacturing the same.

Self-tapping screws are known having generally lobular leading ends with the thread formation in such ends having arcuate polygonal, in most instances triangular, pitch surface cross sections so as to require a minimum driving torque. Such screws may have a main shank portion of circular cross section for maximum holding strength, for example, as shown in U.S. Pat. Nos. 3,246,556, 3,180,126, and 3,461,470. However, a screw having a specified lobular pitch surface, cross section throughout its threaded extent has an advantage over a screw having the lobular pitch surface cross sections only on the leading end of the screw in that the former can be manufactured by rolling a similarly shaped blank between so-called flat conventional thread-rolling dies. See, for example, U.S. Pat. No. 3,195,156. Heretofore screws having a round body and a lobular end portion had to be made using special dies as in U.S. Pat. No. 3,246,556. Such special dies are not only expensive to manufacture but also have been found difficult to set up in the machine to give wholly satisfactory results. It has been recognized that a screw having the lobular pitch surface cross section only on the leading end and circular pitch surface cross sections on the main shank portion is a desirable form of screw for certain uses in requiring minimum driving torque while providing maximum holding strength.

In U.S. Pat. Nos. 3,180,126 and 3,461,470 it is suggested that screws with round body holding sections and lobular lead sections be made with conventional dies. However, in accordance with those two patents, the thread crests of the lobes on the tapered lead section are not fully formed. In U.S. Pat. Nos. 3,246,556 and 3,461,470, there is a relatively sharp transition between the lead section where the thread is lobular and the holding section where the thread is circular. In U.S. Pat. No. 3,180,126 thread-forming and sizing sections of lobular shape are used, and the method provides for a rocking about a fulcrum at the junction of the sizing and holding sections. As a result, it is not possible to form fully developed threads in the holding section at any significant distance from the fulcrum. This severely limits the length of holding section that can be produced.

OBJECTS AND SUMMARY OF INVENTION

Accordingly, the present invention provides a new and improved method of making a self-tapping threaded fastener having a lobular threaded forward tapered end portion and a circular threaded shank section. The method of the invention has advantages over prior methods of making such a screw in that inexpensive thread-rolling dies for rolling straight threads on a main shank portion and tapered threads on the thread-forming, work-entering end portion can be employed. A further advantage of the present method is that the blank which is rolled between the aforementioned dies can be formed from round wire stock. A still further advantage is that the heading die used to reform the blank to its final shape prior to thread-rolling can be of inexpensive construction utilizing a main cylindrical cavity having at the bottom thereof a short extrusion section of lobular cross section.

In accordance with the method of the invention, a blank having a circular cylindrical shank portion, an arcuate lobular forward end portion including a tapered section is rolled between the aforementioned dies in a manner so that the ridged die portion for forming the thread overlies the shank and tapered portions of the blank and a substantially smooth, unridged die surface portion engages the lobular section of the blank. As the blank is rolled between the dies, pressure applied by the substantially smooth die surfaces causes the axis of the forward end of the blank to oscillate between opposite die faces during each revolution of the blank, which oscillation is carried back into the adjacent portion of the blank so that a tapered thread having the desired arcuate lobular pitch surface cross sections is formed on the self-thread-forming section of the blank.

The method further includes the use of a blank with a short, diametrally reduced cylindrical section between the tapered section and the main part of the cylindrical shank section. This reduced section is, of course, threaded during the threading operation. Moreover, the lobulation on the thread forming section of the screw is carried through this reduced section but with the lobulation progressively decreasing and diminishing to zero in the main shank section of the screw. This reduced section aids in preventing the diameter of the circle circumscribing the maximum lobulation from exceeding the crest diameter of the round thread in main shank section of the screw.

The resultant screw of the invention is therefore characterized by a straight cylindrical shank section having a straight thread and a lead section having an inwardly tapered thread of lobular cross section but which lobular cross-sectional configuration extends to a progressively lesser degree onto the shank portion immediately adjacent to said tapered lead section. Thus, the lobulation progressively diminishes to zero in shank section of the screw. Except for the small and diminishing amount of lobulation that extends into the shank section, the latter is cylindrical. The circular crest, root, and pitch surface cross sections of the shank section are respectively uniform from the region where the lobulation reaches zero in a direction toward the head of the screw. In addition, the thread formation on the thread-forming section can be made to have substantially fully developed, sharp crests at least at the thread lobes.

In summary, objects of the present invention are to provide (1) a self-thread forming threaded fastener of consistently uniform shape within narrow tolerances having a threaded shank portion with circular pitch surface cross sections and a threaded tapered lead section with arcuate lobular pitch surface cross sections; and (2) a simplified and low-cost method of making the aforesaid fastener.

DETAILED DESCRIPTION

Figure 6:
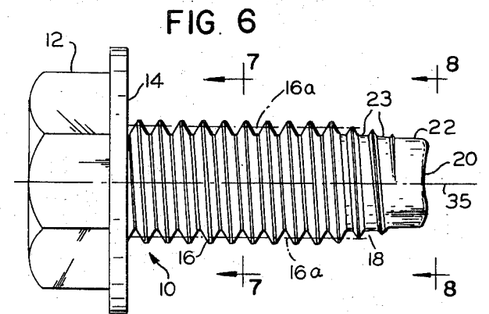
FIG. 6 is a side view of a screw in accordance with the invention.
Figure 7:
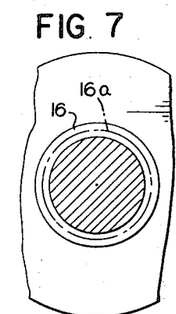
FIG. 7 is a partial transverse schematic sectional view taken along the line 7—7 of FIG. 6.

With reference to the drawings, a self-thread forming screw 10 in accordance with one form of the invention is shown in FIG. 6 having an enlarged hexagonal driving head 12 with flanged washer base 14, a main threaded shank section 16, and a front work-entering end section 18, at least a portion of which is threaded. Shank section 16 has a uniform straight rolled thread formation with pitch cylinder 16a while section 18 has a rolled thread which is tapered and a continuation of the thread on the shank section 16. Shank section 16 is generally cylindrical and the thread formation thereon has circular crest, pitch, and root surface cross sections as most clearly shown in FIG. 7. The front end or lead section 18 has a tapered thread with the crest, pitch, and root surface cross sections thereof being generally of lobular cross section. More specifically, in this modification these tapered threads are arcuate triangular in shape and include arcuate sides 24 which merge at arcuate small radius lobes 26, as most clearly shown in FIG. 8. The height of the threads in lead section 18 becomes progressively smaller in a direction from the shank toward the forward extremity 20 and gradually vanishes before reaching such extremity, resulting in the unthreaded dog point portion 22. This tapered thread 18, in this instance, has substantially fully developed, relatively sharp crests throughout its length, at least in the lobes of the thread cross sections, although the roots 23 of such tapered thread become progressively more truncated toward the work-entering end 20 as will be apparent from FIG. 6.

Figure 8:
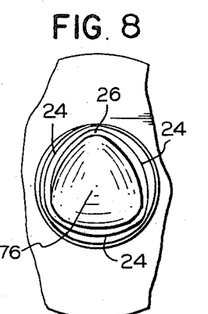
FIG. 8 is a partial end view taken along line 8—8 of FIG. 6.

Referring to FIG. 8, it is evident that the arcuate sides 24 of the lobular cross sections in the lead section of the screw have a radial relief as compared to the cross sections in the main shank which relief becomes progressively less the closer such lobular cross sections are to the main shank. This results in a smooth transition between the threads of the shank section and the lobular threads of the lead section. However, since the lobulation diminishes to zero in shank section 16, the thread convolutions on the main shank section 16 nearest the lead section may also be slightly lobular. This is due to the particular method of manufacture to be described. However, the major part of the thread convolutions of the shank section 16 have substantially uniform circular pitch, root, and crest surface cross sections, respectively, thereby providing maximum holding strength.

Although the illustrated preferred embodiment has threads on the lead section of arcuate triangular pitch surface cross section, such pitch surface cross sections may be of any arcuate lobular cross section having an odd number of arcuate lobes and intermediate arcuate sides. As a practical matter, however, such lobes will usually not exceed five in order to produce the desired low driving torque requirement.

Figure 2:
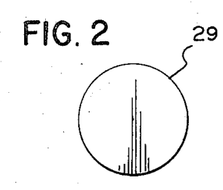
FIG. 2 is an end view of the blank of FIG. 1.
Figure 3:
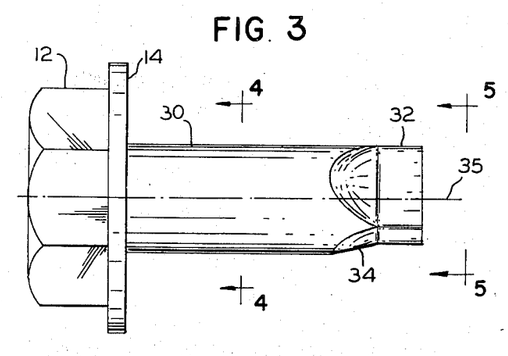
FIG. 3 is a side view of the screw blank following a heading and pointing operation.
Figure 4:
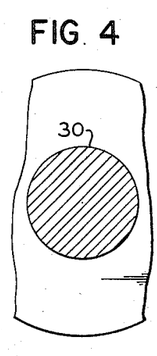
FIG. 4 is a partial transverse sectional view taken along the line 4—4 of FIG. 3.
Figure 5:
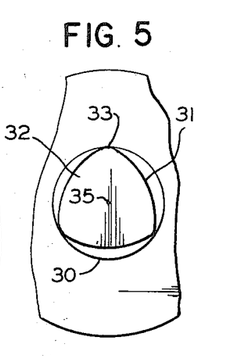
FIG. 5 is a partial end view taken along the line 5—5 of FIG. 3.

A blank on which threads are rolled to produce the screw of FIG. 6 is shown in FIGS. 3, 4 and 5. Such blank is formed from a piece of wine stock shown at 29 in FIGS. 1 and 2 and includes the enlarged head 12 and washer flange 14 of the finished screw, a cylindrical shank section 30 of circular cross section, a forward end section including a lead portion 32 of lobular arcuate, triangular cross section, and an intermediate tapered transition portion 34. The forward end portion 18 of the finished screw of FIG. 6 is formed from the portions 32 and 34 of the blank. The extremity 32 has cross sections generally in the shape of equilateral arcuate triangles having arcuate sides 31 merging at intermediate lobes 33. From FIG. 5 it will be apparent that the axis 35 about which the lobular cross sections of the lead section of the blank are symmetrically arranged is a continuation of the axis of the shank section 30 of the blank. The lobes 33 of the lead section lie substantially in the surface that would be formed by an axial projection of the cylindrical shank surface 30 so that lobes 32 form an approximately straight line axial continuation of the surface of shank section 30 as clearly shown in FIG. 3.

Referring to FIG. 5, the maximum radial relief or eccentricity of the lead section with respect to the shank section is at the midpoint of each of the arcuate sides 31. The amount of eccentricity, or relief, of the sides 31 may vary, for example, from 0.3 to 0.6 times the pitch of the screw thread. Even this relationship would vary for the so-called spaced thread screws. Of course, it will be appreciated that these figures are exemplary only for a given screw blank size and other values of eccentricity would also result in commercially practical screws.

Figure 9:
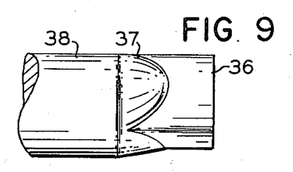
FIG. 9 is a fragmentary side view of an end portion of a screw blank according to a further modification of the invention.

The tapered transition section 34 of the blank need not be of any special cross sectional configuration. For example, although the surfaces which define the section 34 of the illustrated blank are curved in cross section so as to be concentric with respect to the curvature of arcuate sides 31, such surfaces could actually be conically tapered. By conically tapered is meant that the curvature of such transition surfaces in cross section actually would be concentric with respect to the surface curvature of shank 30. As shown in FIG. 9, the front tip section indicated at 36 is of arcuate lobular cross section as shown at 31, 33 in FIG. 5. The transition section 37 with the conical taper is curved in cross section concentric with the round shank 38. The conically tapered transition section 37 may in fact be preferred in many instances because it can be formed with less expensive tooling.

Whether the transition section of the blank is of arcuate lobular cross section as shown in FIG. 3, or conical as shown in FIG. 9, the threads formed thereon will be substantially the same in cross section as shown in FIG. 8. This will be due to the method of manufacture hereinafter described.

As will subsequently appear, if the tapered portion on the forward end section of the blank is of arcuate lobular cross section, similar to that illustrated by lines 31, 33 in FIG. 5, the axial length of the straight side wall end section 32 may be shorter than if the inwardly tapering surfaces 34 of the blank conform to a conical surface. Moreover, if the inwardly tapering surfaces 34 are of arcuate lobular cross section and if the angle of inward inclination is very gradual, such surfaces 34 may be continued substantially to the forward extremity of the end portion of the blank. It is important, however, that a section of substantial length over the forward end portion of the blank be of arcuate lobular cross section whether it has sides that are parallel to each other as shown in FIG. 3 or whether they taper slightly inwardly.

The maximum width of the forward extremity of the blank should not be substantially greater (though it may be less) than the diameter of the pitch cylinder of the thread which is formed on the main shank portion of the finished screw. The pitch cylinder of such thread is indicated by dotted lines 16a in FIGS. 6 and 7.

Figure 1:
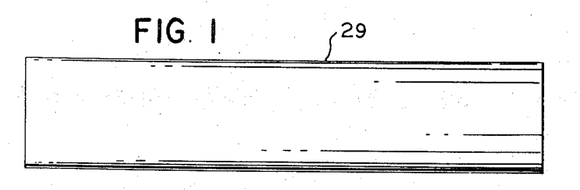
FIG. 1 is a side view of an initial blank from which the screw of the present invention is formed.
Figure 14:
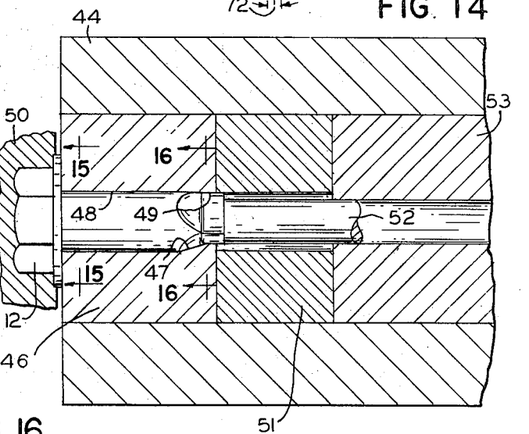
FIG. 14 is a sectional view through a heading die for forming the blank of FIG. 3 and showing the blank within such die.
Figures 15, 16:
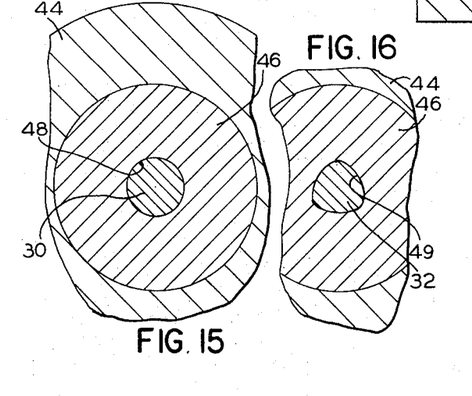
FIGS. 15 and 16 are partial transverse sectional views taken respectively along the lines 15—15 and 16—16 of FIG. 14.

The initial blank of FIGS. 1 and 2 is transformed to the shape shown in FIG. 3 in a heading die as shown in FIGS. 14 through 16. The die includes a shroud portion 44, adapted to be mounted in a conventional screwheading machine, having a cylindrical die insert portion 46. The die insert portion 46 includes an outer die cavity 48 of circular cross section for receiving the cylindrical blank 29. The die insert portion cooperates with one or more heading punches 50 of the heading machine for upsetting and forming the enlarged driving head 12 and washer flange 14 on one end of the initial blank. The die cavity also includes a transition section 47 which is tapered to form the tapered transition section 34 of the blank and a short lobular, parallel walled portion 49 having walls conforming to the desired arcuate lobular shape of the lead section 32 of the blank as illustrated by lines 31, 33 in FIG. 5 or of any of the other lobular shapes hereinafter described. The die is also provided with a relief insert 51 behind the extruding insert 46 and a guide bushing insert 53 within which is suitably mounted the end of an axially reciprocable knockout pin 52 for ejecting the formed blank from the heading die.

Figure 10:
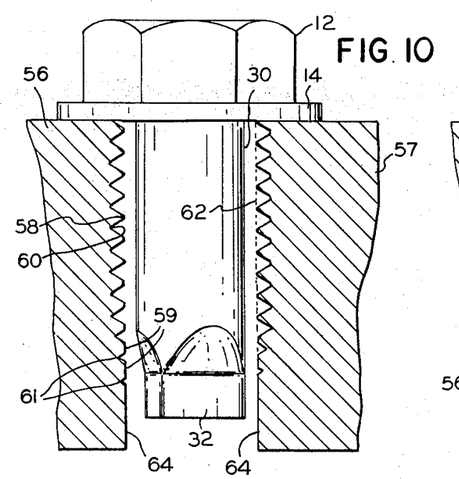
FIG. 10 is a sectional view through a pair of dies in accordance with the invention with the screw blank of FIG. 3 inserted in a spaced apart relation between such dies.

A pair of thread-rolling dies 56, 57 according to one modification of my invention is illustrated in FIG. 10, for convenience in a spaced apart relationship, for rolling threads on the blank of FIG. 3. These dies are generally flat, at least in a direction extending along the length of the blank, that is, transversely of the dies. Each die has a series of alternating ridges 58 and grooves 60, the ridges and grooves being designed for forming a straight thread on the shank section 30 of the blank and a tapered thread with fully developed crests on the tapered transition section 34 of the blank but with a gradually diminishing thread height in a direction toward the blunt work-entering end 32. It will be observed that the crests of the die ridges 58 all lie in the same plane, namely along the same straight line 62 as viewed in FIG. 10. Moreover, in that portion of each die which is adjacent the tapered section 34 of the blank, the depth of the grooves decreases progressively in a direction toward the lower edge of the dies, as viewed in FIG. 10, although the bottom of such grooves remain sharply defined as indicated at 61. However, the crests 59, which lie adjacent the transition section of the blank, become progressively more truncated in a direction toward the blank extremity 32 until finally the increasingly flattened crests merge with the smooth or substantially smooth edge portions 64 of the dies. The smooth edge portion 64 overlie the end portion 32 of the blank and also extend in the same plane or line 62 as the crests of the die ridges 58. Thus, each die can be said to be composed of at least two distinct die portions including a first die section with ridges and grooves extending over a width of the die corresponding substantially to the length of the threaded portion of the blank, and a second smooth, or substantially smooth, edge surface portion 64 of the die.

The screw of FIG. 6 is manufactured using the aforedescribed tooling in accordance with the following method:

First, the initial cylindrical blank 29 is transformed into the screw blank shown in FIG. 3 by means of the heading die shown in FIG. 14 in a conventional heading machine. The screw blank is then transferred to the thread-roller provided with thread-rolling dies 56 and 57. While the dies 56 and 57 have been illustrated and described as being flat, it will be obvious that they may be or rotary type thread-rolling dies as well. The thread-rolling operation will be described with reference to FIGS. 11, 12 and 13.

Figure 13:
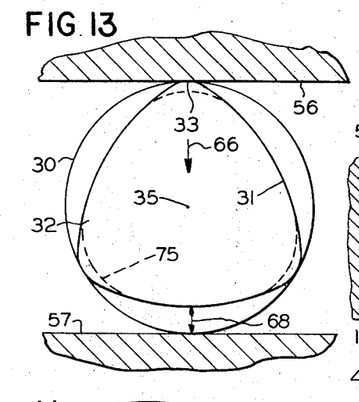
FIG. 13 is a schematic end view of the dies of FIG. 11 at the start of the thread-rolling operation upon a screw blank.

Referring first to the schematic sketch of FIG. 13, the parallel surfaced members 56, 57 represent the opposed parallel surfaces of the thread-rolling dies. The shank portion of the screw blank is indicated at 30 while the end portion of the blank of arcuate, lobular, triangular shape is indicated at 32. It will be observed that while the surfaces of the dies 56 and 57 are in engagement with diametrically opposite sides of the shank 30, only the uppermost lobe 33 of the end portion 32 of the blank is in engagement with the upper die 56 while the lower surface 31 of the portion 32 is spaced from the surface of die 57 as indicated by space 68. Assume that a pressure is now applied to the screw blank between the dies 56 and 57. Since the surfaces of the dies 56, 57 engage the round portion 30 of the blank, grooves corresponding to the ridges in the die surfaces will be formed in the opposite sides of the blank 30. However, since the portion 64 (FIG. 10) of the die 56 which is in engagement with the lobe 33 of the end portion 32 is smooth, it cannot penetrate into the metal of the lobe 33 and as a result the end portion 32 of the blank will be deflected downwardly, as viewed in FIG. 13, in the direction of the arrow 66.

Figure 12:
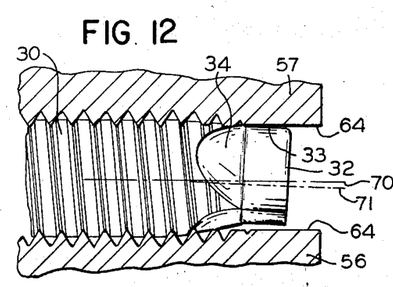
FIG. 12 is a fragmentary sectional view illustrating an intermediate stage in the formation of thread upon the screw blank.

In FIG. 12 is illustrated a screw blank with only partially formed threads between a pair of opposed dies 56, 57 at the commencement of a thread-rolling stroke. This view further illustrates how the end portion 32 of the blank is deflected downwardly, as viewed in FIG. 12, due to pressure of the smooth surface portion 64 of the upper die 56 against the upper lobe 33 of the end portion 32. Such deflection of the end portion of the blank occurs each time one of the lobes comes in contact with one or the other of the dies 56, 57. In other words, the axis 70 of the forward end portion of the screw blank is deflected to a position such as indicated at 71 each time one of the lobes comes in contact with one of the smooth surface edge portions 64 of one of the dies. The axis of the forward end portion of the blank is therefore substantially continuously oscillated or gyrated about the axis 70 of the rearward portion 30 of the screw blank, first toward one die and then the other. The path of movement of the deflected portion 71 of the axis during the thread-rolling operation is therefore of a sinuous or undulating nature. The result is that the inwardly tapered thread provided on the forward end portion of the blank as shown in FIG. 3, including the tapered shoulder 34, is provided with pitch, root and crest surface configurations which are of arcuate, triangular cross-sectional configuration substantially similar to the cross-sectional configuration of the original end portion of the blank.

Figure 11:
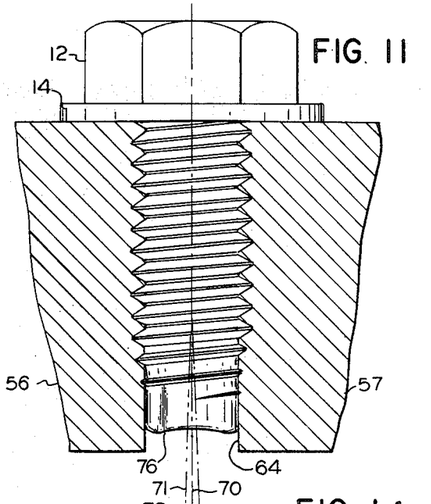
FIG. 11 is a sectional view of the dies of FIG. 10 after threads have been developed on the blank.

FIG. 11 illustrates the screw with the thread substantially completed and just prior to ejection of the screw from between the dies. The axis of the screw is indicated at 70 while the angle 72 represents the total angle of oscillation or deflection of the forward end of the screw during the thread-rolling operation. It will be understood that the axis 70 in the shank portion toward the rear or head end of the screw does not oscillate. In practice, the oscillation of the axis at the forward end of the blank is carried back through the tapered section and may in fact be continued to a continuously diminishing degree into a short portion of the shank section immediately adjacent to the tapered portion. This oscillating action of the blank axis through the lead and transition sections results in the formation of a thread in such sections having fully developed crests of generally lobular configuration, more specifically one in which the pitch surface cross sections have a generally arcuate lobular shape dictated by the cross-sectional shape, of the forward end section of the blank. Thus, if the end section has an arcuate, triangular cross-sectional shape, the resultant pitch surface cross sections of the resultant thread on the lead section of the screw will likewise be of arcuate, triangular cross section. However, because of the fact that the degree of oscillation of the axis will diminish in a direction toward the shank section 30 of the blank during the thread-rolling operation, the pitch surface cross sections of the thread will become progressively more circular as they approach the shank section of the blank and will be circular in those shank sections in which the rotational axis has no oscillation.

Due to the pressures of the die edge portions 64 upon the lobes 33 of the screw blank, the latter tend to become somewhat less sharply rounded following the thread-rolling operation to a condition indicated generally by dotted lines 75 in FIG. 13. Also the forward end surface of the screw may become slightly cupped as at 76 in FIGS. 8 and 11.

In the embodiment of the screw blank shown in FIG. 3, the end portion 32 has a substantial axial length with outer side walls parallel to each other in the axial direction and also this end portion is primarily engaged by edge portions 64 of the thread-rolling dies which are smooth. It will be obvious that if the tapered section 34 has cross sections of arcuate triangular shape and has a substantial axial length, the length of the straight walled end section can be reduced or, in some circumstances, substantially eliminated. It will be apparent that the relatively wide flat crests of the truncated ridges 59 as shown in FIG. 10 serve in the same manner as the adjacent smooth edge portions 64 in causing deflection and rotational oscillation of the end portion of the blank during thread-rolling.

Figure 17:
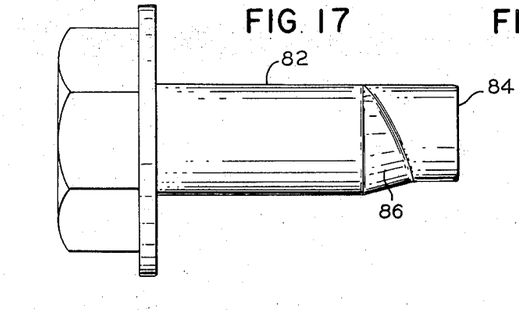
FIGS. 17 and 18 are side and partial end views, respectively, of a modified screw blank.
Figure 18:
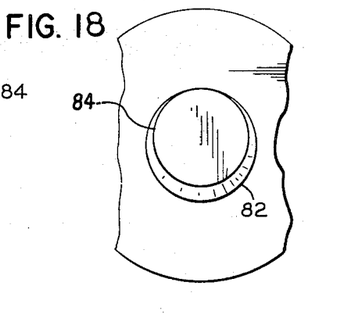

In accordance with the further modifications of the invention discloses in FIGS. 17 to 22, self-thread forming screws are shown having but a single lobe disposed eccentrically with respect to the central longitudinal axis of the screw. Referring first to FIGS. 17 and 18, a blank is shown similar to that of FIG. 3 including a round cylindrical shank portion 82 and an eccentric, lobular lead portion 84. The lead portion 84, in this instance, is of circular cross section having a diameter less than the diameter of the shank portion 82. A conically tapered shoulder 86 joins the lead portion 84 to the shank portion 82.

Figure 19:
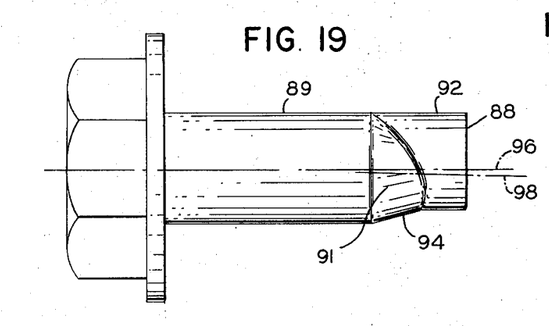
FIGS. 19 and 20 are side and partial end views, respectively, of a further modified screw blank.
Figure 20:
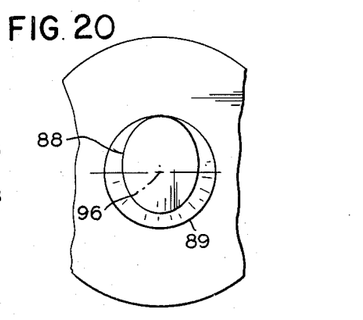

It is understood that the eccentric lead portion 84 need not be circular in cross section but may be elliptical, such as shown in FIGS. 19 and 20. Thus, the lead portion 88 on the end of the round cylindrical shank 89 has an elliptical cross section as shown more clearly in FIG. 20, the lead portion 88 being joined to the shank by the conically tapered shoulder 91.

Figure 21:
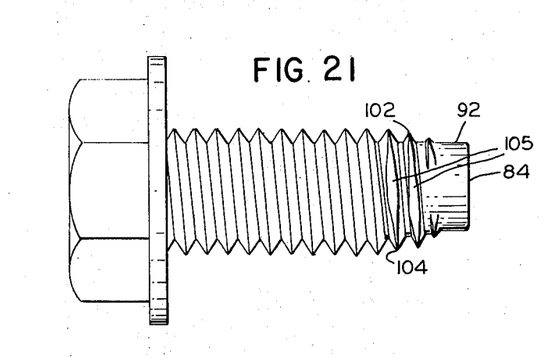
FIG. 21 is a side view of a screw in accordance with the invention.
Figure 22:
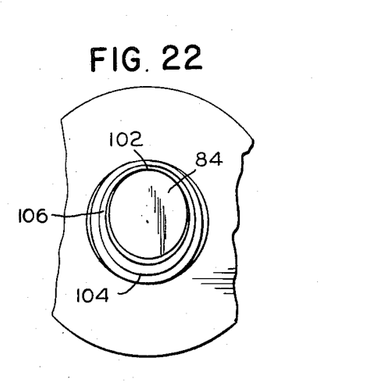
FIG. 22 is a partial end view of the screw shown in FIG. 21.

A finished screw, following the thread-rolling operation, is shown in FIGS. 21 and 22, it being understood that the resultant threads formed by the thread-rolling operation upon either of the blanks of FIGS. 17 or 19 are substantially similar, the only difference being in a slight difference in the cross-sectional shape of the lead point as mentioned above relative to the blanks. It is to be understood that in accordance with the method of the present invention, the threads may be rolled upon the blanks of FIGS. 17 and 19 by thread-rolling dies either as previously mentioned or as hereinafter described.

When rolling threads with a pair of dies as shown in FIG. 10, for example, each time the upper surface 92 of the lead portion 88 of the blank illustrated in FIG. 19 engages against the flat surface portion 64 of one of the dies 56 or 57, the lead portion will be deflected in the direction away from the engaging die thereby forcing the lower surface portion 94 of the tapered section 91 opposite the lobe surface 92 into the thread-forming ridges of the opposite die. During the thread-rolling operation, the longitudinal centerline 96 of the blank, which is, of course, eccentric with respect to the lead section 88, will oscillate back and forth between the position indicated at 96 and the position shown in dotted lines 98.

Referring now to FIG. 21, it will be observed that crests 102 of the threads along the upper side of the screw over the front end thereof and the crests 104 on the opposite side are sharp while the crests 105 of the intermediate portions of the threads are relatively shallow and unfinished. As shown in FIG. 22, the thread on the tapered portion is provided with lobes 102 and 104 and reliefs 106 therebetween.

Figure 23:
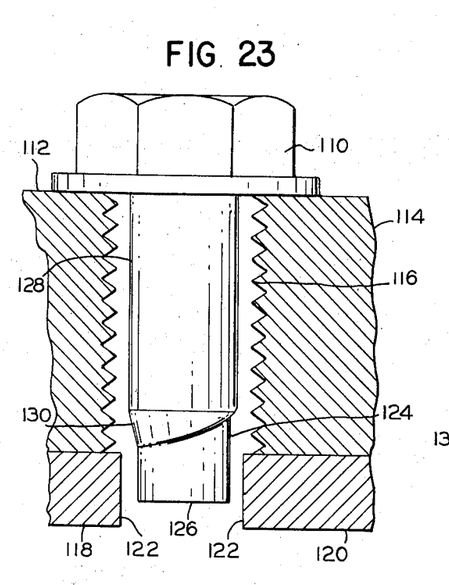
FIG. 23 is a side view of a screw blank in accordance with a still further modification of the invention positioned between a pair of thread-rolling dies also in accordance with a further modification of the invention.

In the case of the dies 56 and 57 shown in FIGS. 10 and 11, the smooth surfaced edge portions 64 are formed as an integral part of the dies. It will be obvious that such smooth surfaced edge portions may be formed as separate elements operatively secured to the longitudinal edge portion of the dies 56 and 57. In FIG. 23 a screw blank 110 arranged between a pair of thread-rolling dies 112 and 114. The dies have thread-forming ridges 116 which are of uniform height throughout their entire lateral extent. Operatively secured to the lower edges of the dies 112, 114, respectively, are longitudinal edge portions 118 and 120 having smooth surfaces 122 facing each other and adapted for engaging with the eccentric lobe or lobes, as the case might be, such as indicated at 124 of the blank 110. In this instance, the diametrical width of the lead section 126 of the blank is less than the diameter of the cylindrical shank 128 of the blank 110 and, accordingly, the edge portions 118 and 120 are so positioned relative to the plane of the crests of the die ridges 116 that they are spaced closer together, thereby compensating for the reduced diameter of the lead section 126. The smooth surfaced edge portions 118, 120 will function in the same manner as the smooth surfaced portions 64 of the dies illustrated in FIG. 10 to engage with the lobe or lobes of the lead section 126 of the screw blank to cause intermittent lateral deflection thereof, thereby producing a lobular tapered thread on the tapered shoulder 130 of the blank 110.

In FIG. 23 the lead section 126 of the blank is of the single lobular form as illustrated in FIG. 17. However, a blank as shown in FIG. 3 of tri-lobular form but of reduced diametrical width may be substituted for the blank 110.

Figure 24:
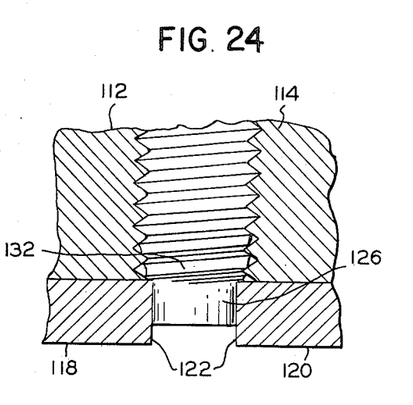
FIG. 24 is a fragmentary view illustrating the end portion of a screw formed from the blank shown in FIG. 23 together with portions of the thread-rolling dies.

With thread-forming dies having ridges 116 of uniform height throughout their entire transverse width, the crests of the threads formed on the tapered portion of the blank will not be sharp as shown in FIG. 6. Instead, the crests of the thread on such tapered portion will be unfinished as shown at 132 in FIG. 24.

Figure 25:
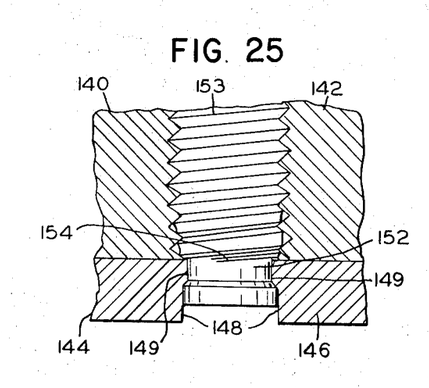
FIG. 25 is a fragmentary view illustrating the end portion of a screw in accordance with a still further modification of the invention as well as portions of a pair of thread-rolling dies for producing the screw shown in conjunction therewith.

Thread-rolling dies having separately formed edge portions may be desirable for a variety of reasons. In FIG. 25 are illustrated a pair of thread-rolling dies 140, 142, in this instance similar to the dies 112, 114. Operatively attached to the lower edges, as viewed in FIG. 25, are a pair of edge strips 144 and 146. The strips 144 and 146 have smooth surfaced portions 148. Throughout the greater length of the strips 144 and 146, the smooth surfaces 148 extend the full width of the strips 144 and 146. However, at the rear ends of the strips 144 and 146, slightly raised surfaces 149 are formed so as to form a groove 152 in the lead section of the screw 153 immediately adjacent the end 154 of the tapered portion of the screw thread. This grooving action is accomplished during the final revolutions of the threading action after the formation of the lobular lead threads. Such a slight relief or undercut adjacent the end of the starting threads is sometimes desirable for facilitating thread pickup as when a screw is to be used in connection with a close-fitting pilot hole.

Figure 26:
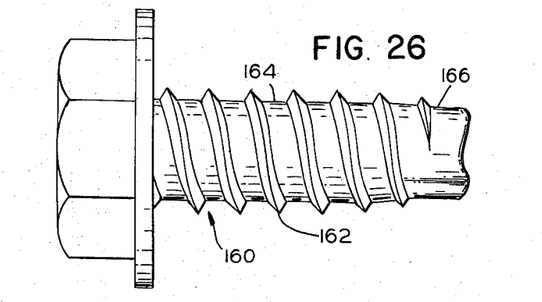
FIG. 26 is a side view illustrating a screw according to a still further modification of the invention.

The present invention is particularly useful in connection with the formation of spaced thread screws of the type illustrated in FIG. 26. The screw 160 in this instance is characterized by threads 162 which are sharp crested throughout the full extent separated by wide roots 164. The threads are, of course, tapered at the work-entering end as indicated at 166. Such screws are particularly suitable for use in connection with plastics and like relatively soft materials. screws of the type shown in FIG. 26 may readily be made in accordance with the methods herein described.

In summary, it is to be emphasized that the arcuate lobular cross section of the thread of the front or lead section of the screw advantageously continues onto the first few thread turns on the shank portion immediately adjacent the tapered lead portion but to a progressively diminishing degree of out-of-roundness. These slightly out-of-round threads gradually merge into the circular threads of the main shank portion and serve to burnish smooth the threads initially formed in the side walls of the pilot hole in the workpiece by the principal thread-forming threads on the work-entering end portion of the screw.

Figure 27:
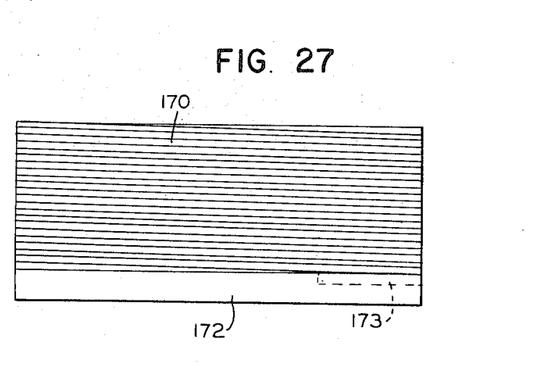
FIG. 27 is a plan view of a thread-rolling die in accordance with my invention.

FIG. 27 schematically illustrates in plan view a thread-rolling die including one portion 170 which is provided with thread-forming ridges and a second portion 172 which has a plane, or smooth upper surface. The portion 170 may be provided with any suitable form of thread-forming die ridges such as, for example, those shown in FIG. 10 on the dies 56, 57, or as shown in FIG. 23 on the dies 112, 114, or as may be required for rolling threads on the screws shown in FIG. 26. Furthermore, the edge portion 172 may be formed as an integral part of the die portion 170, as shown in FIG. 10 at 64, or it may be a separate piece as shown at 122 in FIG. 23. The part 172 may also be provided with a raised rib adjacent the die part 170 and at the trailing end of the die as shown at dotted lines 173 to conform to the raised portion 149 shown in FIG. 25.

Figure 28:
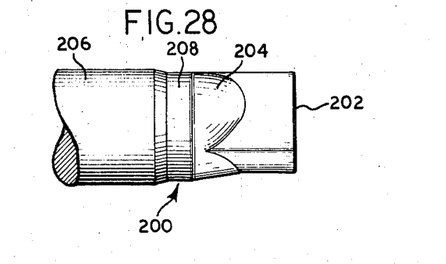
FIG. 28 is a fragmentary elevation of a modified form of a blank for making the screw of the present invention.

FIG. 28 shows a modified form of blank 200 which is similar to the blank shown in FIG. 9. Thus, the blank 200 includes a front end section 202 of arcuate lobular cross-section such as that shown at 31 and 33 of FIG. 5. In addition, the blank 200 has a conically tapered transition section 204 similar to the transition section 37 of FIG. 9. The rear or round shank portion has two coaxial sections 206, 208 each of circular cross section, the second-mentioned section 208 being intermediate the tapered section 204 and the first-mentioned section 206. The section 208 is of a diameter that is less than that of the section 206 by an appropriate amount. This difference in diameter may, for example, be about 0.0015 to 0.0020 inches. It will be noted also that the maximum size or beginning of the tapered portion 204 is the same as the diameter of the section 208 since the latter is joined at its forward axial end by the beginning of the tapered portion 204. The axial length of the section 208 may, for example, be on the order of twice the pitch of the thread to be rolled onto the blank.

During the thread rolling operation, as previously described, the thread will, of course, be formed in the section 208. The thread will be lobular but will have less lobulation than in the lead section of the screw. Thus, the lobulation will continue through the part of the screw corresponding to the section 208 but in a progressively diminishing amount, reaching zero lobulation in the section 206. The short reduced diameter section 208 is helpful in preventing the circle circumscribing the lobulation from having a diameter that exceeds the crest diameter of the thread in the main part of the screw, such as at 16 in FIG. 6. This aids in providing the smooth transition of the thread from lobular to circular cross section and prevents oversizing the thread in the workpiece.

It should also be noted that a reduced diameter section such as at 208 may be incorporated in any of the previously described blanks. Thus, such a section may be interposed between the main circular shank portion of the blank and the tapered portion of the blank regardless of the nature of the tapered portion (e.g. conical or arcuate, lobular) and regardless of the nature of the lobulation of the front end of the blank.

Figure 29:
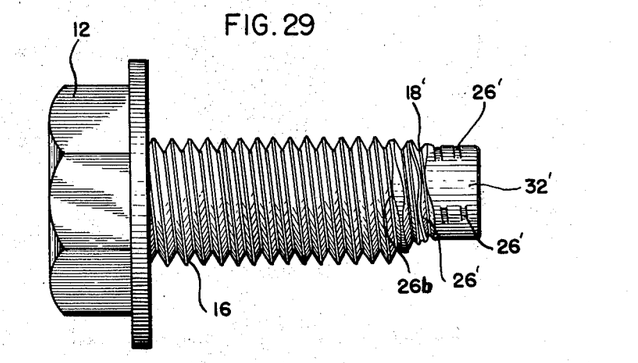
FIGS. 29 and 30 are side and partial end view, respectively, of a screw according to another modified form of the invention.
Figure 30:
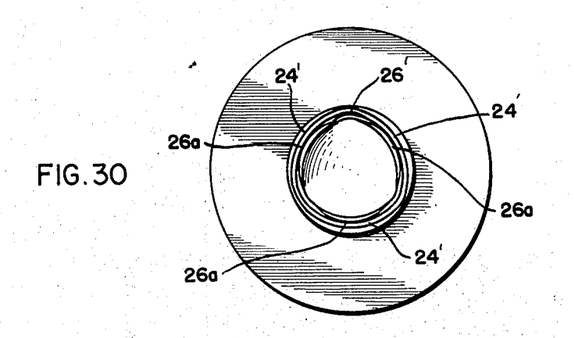
Figure 31:
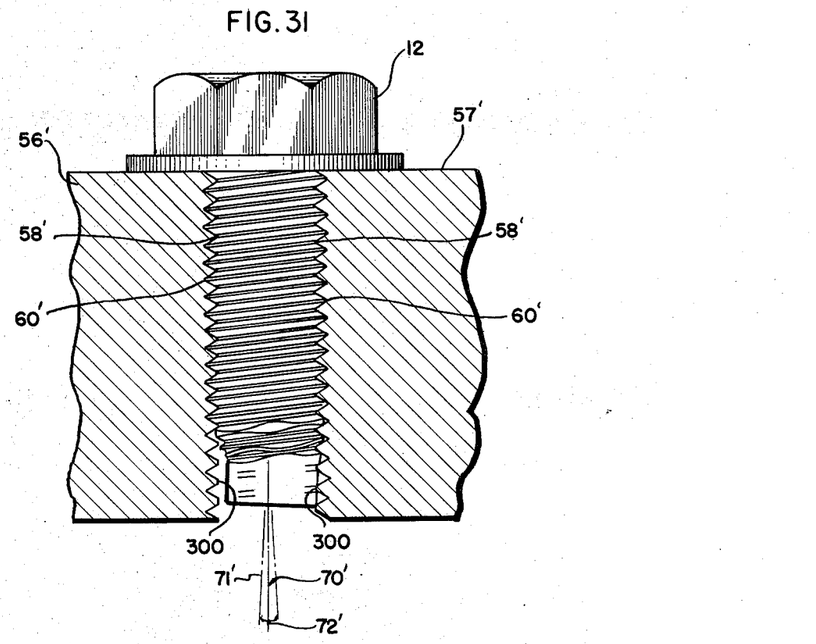
FIG. 31 shows a method of making the screw of FIGS. 29 and 30.

FIGS. 29 and 30 show a modified form of screw which can be made from blanks of the general type shown in FIGS. 3, 9 or 28 and using the dies 56', 57' shown in FIG. 31. Like FIG. 11, FIG. 31 illustrates the screw blank in its final phase of thread-rolling.

The dies 56', 57' differ from the dies of FIGS. 10 and 11 in that the former have grooves 60' of uniform depth for the full faces of the dies rather than of decreasing depth as in FIGS. 10 and 11. Also, the die ridges or crests 58' are sharply defined except in the region of the work entering section of the blank where the crests 300 are slightly truncated and are thus flattened to a considerably lesser degree than the truncations 59 of FIG. 10.

The blank used should have a relatively long taper and lobular end. When the blank is rolled between the dies 56', 57', the axis 70' of the blank will deflect as shown at 71' through an angle 72'. This angle deflection or bending 72' is considerably less than the angle of deflection 72 of FIG. 11 since the crests 300 undergo some penetration of the blank. The amount of deflection is essentially dependent upon the amount of truncation of the crests 300. Sharply crested ridges at the work entering end will not suffice as this would preclude any deflection of the blank.

During the thread rolling, the partial penetration of the crests 300 and the limited deflection of the front end portion of the blank due to pressure from the crests 300 results in a partially developed thread on the front end portion of the blank. The partial development of the crest of the thread results in the formation of secondary lobes 26a, 26a, 26a in addition to the primary lobes 26', 26', 26'. These secondary lobes 26a are formed opposite to the primary lobes 26' due to the fact that maximum deflection takes place when the peak of a blank lobe is against a die crest 300. Thus, the opposite arcuate side of the blank is pressed into the opposite die face for partial thread formation to constitute the secondary lobe.

As a consequence of the method of FIG. 31, there is formed a screw in which the work entering end 32' of the section 18' has three primary lobes 26' with slightly developed threads, and the tapered portion of the section 18' has three primary and three secondary lobes. The secondary lobes 26a of partially developed threads are circumferentially intermediate the primary lobes 26' and are flatter (i.e. of longer arc) than the primary lobes. Thus, the secondary lobes do not project radially to the same extent as do the primary lobes. In addition it will be apparent that the amount of development of the primary and secondary lobes will progressively increase in the direction toward the head of the screw.

The secondary lobes have the advantage of providing positive alignment and stability in starting the screw in the pilot hole in the workpiece since up to six lobes may be used to center the screw rather than three. In this regard it will be recognized that ideally the pilot hole of the workpiece will have a diameter equal to the pitch diameter of the cylindrical shank section 16. The crests of the secondary lobes are, in general, developed to an extent greater than such pitch diameter.

It should also be noted that the partial development of the thread crests of the secondary lobes 26a tends to be accentuated at the flank 26b that is highest on the taper, that is at the flank presented toward the screw head. On the other hand, the partially developed crests at the primary lobes appear to be more nearly the same for each flank but of somewhat lesser total development. It is believed that any such dissimilar development of the lobes results in the secondary lobes aiding to some extent in the swaging or possibly the burnishing of the thread in the workpiece. However, there is no indication that the additional lobes significantly affect the drivability of the screw.

The invention is claimed as follows:

1. A method of rolling the thread of a self-threading screw from a blank having a rear shank portion and a front end portion having a cross-section of arcuate, lobular shape of reduced thickness and including a tapered portion, said rear shank portion including first and second sections of circular cross section, said second section being intermediate said first section and said tapered portion and having a diameter that is less than that of said first section but is greater than said reduced thickness, said method including rolling the blank between opposed thread rolling dies that apply thread-forming pressure simultaneously to said sections of said rear shank portion and to said tapered portion to form a thread thereon, and applying intermittent deflecting pressures to said front end portion during the thread rolling to bend the same relative to the axis of said rear shank portion and thereby periodically vary the distance of the axis of said front end portion to said dies.

2. A method according to claim 1 wherein said thread-rolling pressures form a thread in said second section such that no crest portion thereof is radially outwardly of any crest portion of the thread in said first section.

3. A method according to claim 1 in which said second section extends to the beginning of said tapered portion.

4. A method according to claim 2 wherein said thread-rolling pressures form a thread of circular cross section in said first section and a lobular thread in said second section and in said tapered portion, the lobulation progressively decreasing in the direction from said tapered portion through said second section and diminishing to zero in said first section.

5. A method according to claim 1 in which said front end portion includes arcuate sides that are joined by primary lobes, and the deflecting pressures are such that the thread is only partially formed in said front end portion and secondary lobes are formed on said arcuate sides circumferentially intermediate the primary lobes.

6. A method of rolling the thread of a self-threading screw from a blank having a rear shank portion of circular cross-section and a front end portion having a cross section of arcuate, lobular shape of reduced thickness, said arcuate shape including arcuate sides that are joined by lobes, said method including rolling the blank between opposed thread rolling dies that apply thread-forming pressure simultaneously to said portions to form a thread thereon, and applying intermittent deflecting pressures to said front end portion during the thread rolling to bend the same relative to the axis of said rear shank portion and thereby periodically vary the distance of the axis of said front end portion to said dies, the deflection being such that the thread on said front end portion is only partially formed by slightly truncated die ridges and secondary lobes are formed on said arcuate sides intermediate the first-mentioned lobes.

* * * * *